United States Patent
Yamaya

(10) Patent No.: US 7,598,995 B2
(45) Date of Patent: Oct. 6, 2009

(54) DIGITAL CAMERA HAVING A MODE-SELECTING SCREEN

(75) Inventor: Hiroyuki Yamaya, Kanagawa (JP)

(73) Assignee: HOYA Corporation, Tokyo (JP)

( * ) Notice: Subject to any disclaimer, the term of this patent is extended or adjusted under 35 U.S.C. 154(b) by 572 days.

(21) Appl. No.: 11/044,053

(22) Filed: Jan. 28, 2005

(65) Prior Publication Data
US 2005/0168611 A1    Aug. 4, 2005

(30) Foreign Application Priority Data
Jan. 30, 2004    (JP)    ............... P2004-023177

(51) Int. Cl.
*H04N 5/222* (2006.01)
*G03B 7/26* (2006.01)

(52) U.S. Cl. ............... 348/333.02; 348/333.01; 348/333.13; 396/280

(58) Field of Classification Search ............ 348/333.01, 348/333.12, 333.13, 207.99, 376, 333.02; 396/373, 280, 374
See application file for complete search history.

(56) References Cited

U.S. PATENT DOCUMENTS

| | | | |
|---|---|---|---|
| 5,659,817 A * | 8/1997 | Fujino et al. | 396/137 |
| 5,761,554 A | 6/1998 | Kirigaya et al. | |
| 6,556,784 B2 | 4/2003 | Onuki | |
| 6,778,770 B1 * | 8/2004 | Cazier et al. | 396/77 |
| 7,061,535 B2 * | 6/2006 | Misawa et al. | 348/375 |
| 7,092,024 B2 * | 8/2006 | Kawamura et al. | 348/333.12 |
| 2001/0038748 A1 | 11/2001 | Onuki | |
| 2004/0008274 A1 * | 1/2004 | Ikari et al. | 348/370 |
| 2004/0051807 A1 * | 3/2004 | Niwa | 348/372 |

FOREIGN PATENT DOCUMENTS

| | | |
|---|---|---|
| JP | 8-036203 A | 2/1996 |
| JP | 11-308490 | 11/1999 |
| JP | 11-308555 | 11/1999 |
| JP | 2000-194030 A | 7/2000 |

OTHER PUBLICATIONS

English language Abstract of JP 2000-194030 A (Jul. 14, 2000).
English language Abstract of JP 8-036203 A (Feb. 6, 1996).
English language Abstract of JP 11-308555, Nov. 5, 1999.

* cited by examiner

*Primary Examiner*—Sinh Tran
*Assistant Examiner*—Daniel M Pasiewicz
(74) *Attorney, Agent, or Firm*—Greenblum & Bernstein, P.L.C.

(57) ABSTRACT

A digital camera with a display has a mode-setting member, an initial-screen displayer, and a mode-setting processor. The mode-setting member is provided on the digital camera, and is available for selecting and determining a mode from plural modes while electric power is ON. The initial-screen displayer displays a mode-selecting screen for selecting a mode as an initial-setting screen when electric power is turned ON. The mode-setting processor sets a selected and determined mode in accordance with an operation of the mode-setting member.

8 Claims, 6 Drawing Sheets

DIGITAL CAMERA HAVING A MODE-SELECTING SCREEN

BACKGROUND OF THE INVENTION

1. Field of the Invention

The present invention relates to a digital camera with a display. Especially, it relates to setting a mode when starting the camera.

2. Description of the Related Art

In a digital camera, a mode dial or a mode button for selecting one mode from plural modes, such as a photograph-mode, a replay-mode, and so on, is provided on the camera. The dial or button can be operated regardless of the power-ON/OFF state of the camera. On the other hand, in very compact cameras, a mode dial or mode button is not provided on the camera, and a selector such as a cross-shaped button (four-way controller), which is provided for deciding a photograph conditions or selecting an image to be displayed, is operated to select a mode. When the above compact camera has a zoom lens or a focusing lens, when electric power is turned ON, the zoom lens or focusing lens is driven in the initial start-up process and the photograph-mode is automatically set. The camera motions in accordance with the selected and determined photograph-mode.

SUMMARY OF THE INVENTION

An object of the present invention is to provide a digital camera that is capable of effectively setting a mode when the electric power is turned ON.

A digital camera according to the present invention has a display, and a mode is selected by using the display while electric power is ON. Namely, a screen for selecting and determining a mode is displayed, and the user selects and determines the mode in accordance with the screen. The digital camera according to the present invention has a mode-setting member, an initial-screen displayer, and a mode-setting processor.

The mode-setting member is provided on the digital camera, and is available for selecting and determining a mode from plural modes while electric power is ON. The mode-setting member is operated while the electric power is supplied to the camera. An exclusive button for setting a mode is not provided on the camera, and the mode-setting member, which is used for other tasks, is utilized for mode-setting. When electric power is turned ON, the initial-screen displayer displays a mode-selecting screen for selecting a mode as an initial-setting screen. As for the mode, various modes, such as a photograph-mode for shooting an object, a replay-mode for replaying an image, a menu-mode for setting various functions, and so on, are prepared. For example, literal information or character information corresponding to the plural modes are displayed on the display. Then, the mode-setting processor sets a selected and determined mode in accordance with an operation of the mode-setting member.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENTS

Hereinafter, the preferred embodiment of the present invention is described with reference to the attached drawings.

Figure 1:
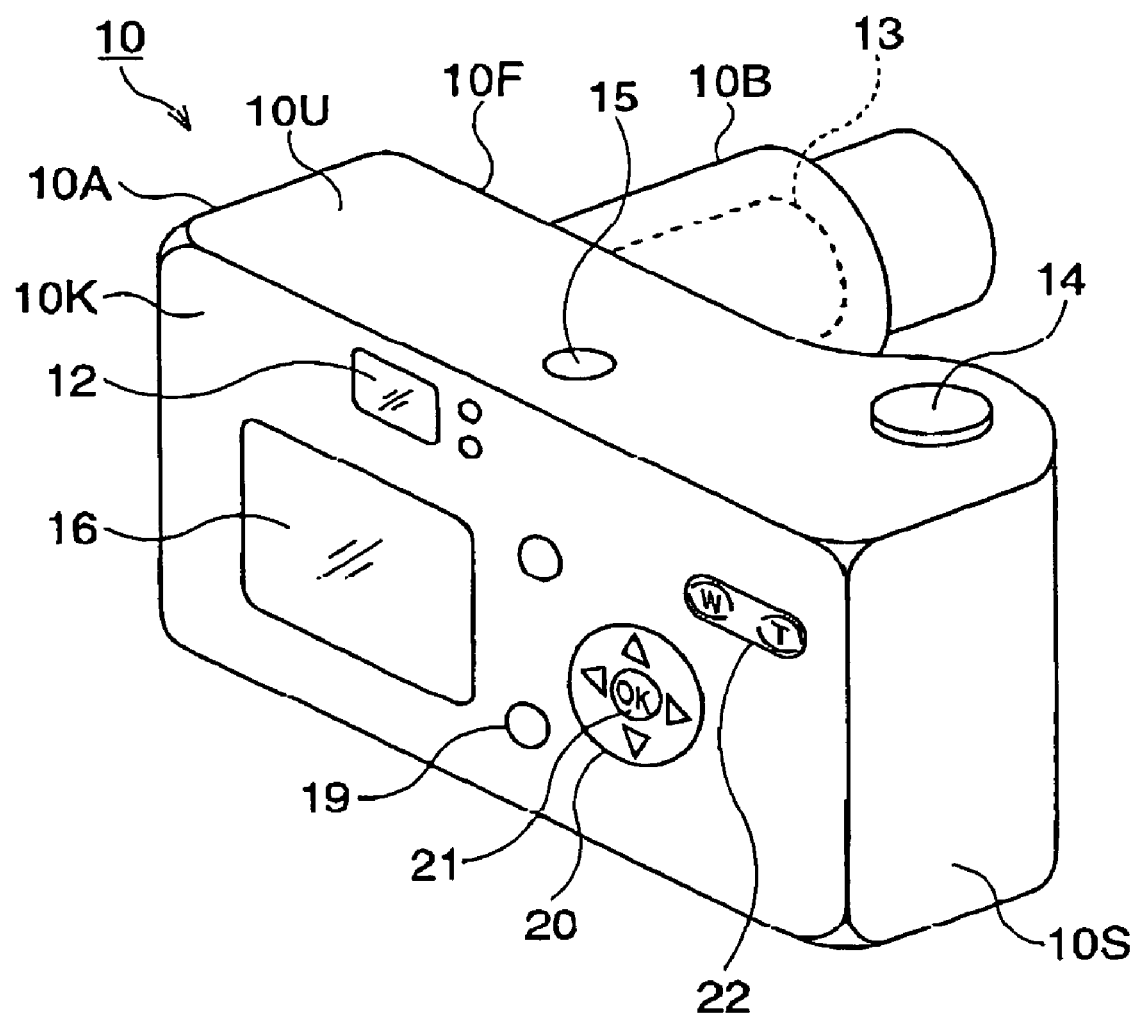
FIG. 1 is a schematic perspective view of a digital still camera.

FIG. 1 is a schematic perspective view of a digital still camera according to a present embodiment. The digital still camera 10 is a compact camera, and has a body 10A and a lens barrel 10B with an optical photographing system 13. The lens barrel 10 is mounted on a front surface 30F of the body 10A. The lens barrel 10B freely extends from the body 10A.

On an upper surface 10U of the digital still camera 10, a release button 14 and a power switch button 15 are provided. While, on a back surface 10K of the camera 10, an eyepiece 12, a LCD monitor 16, a return button 19, a cross-shaped setting button 20, an enter button 21, and a zoom button 22 are provided. On a side surface 10S of the camera 10, a card slot (not shown) is formed, and a strobe (herein not shown) is provided on the front surface 10F of the camera 10.

The zoom button 22 is operated to perform a zoom-motion, the user operates the zoom button 22 to define the visual range and a composition of an object image. The cross-shaped setting button 20 and the enter button 21 are operated to select and determine a mode, when setting one mode from a photograph-mode, a replay-mode, and a menu-mode, or when setting one specific photograph-mode from plural photograph-modes. Further, the setting button 20 and the enter button 21 are operated to change the photograph conditions while the menu-mode is selected. When electric power is turned ON, as described later, a mode setting process is performed in the initial starting process.

When the photograph-mode is set, namely, is selected and determined by the user, the optical photographing system 13 in the lens barrel 10B is driven so that the optical photographing system 13, which is accommodated in the body 10A, extends from the body 10A with the lens barrel 10B. On the other hand, when the replay-mode is set, a recorded image is displayed on the LCD monitor 16. The return button 19 is operated to return a present displayed screen to a previous screen while setting a mode.

Figure 2:
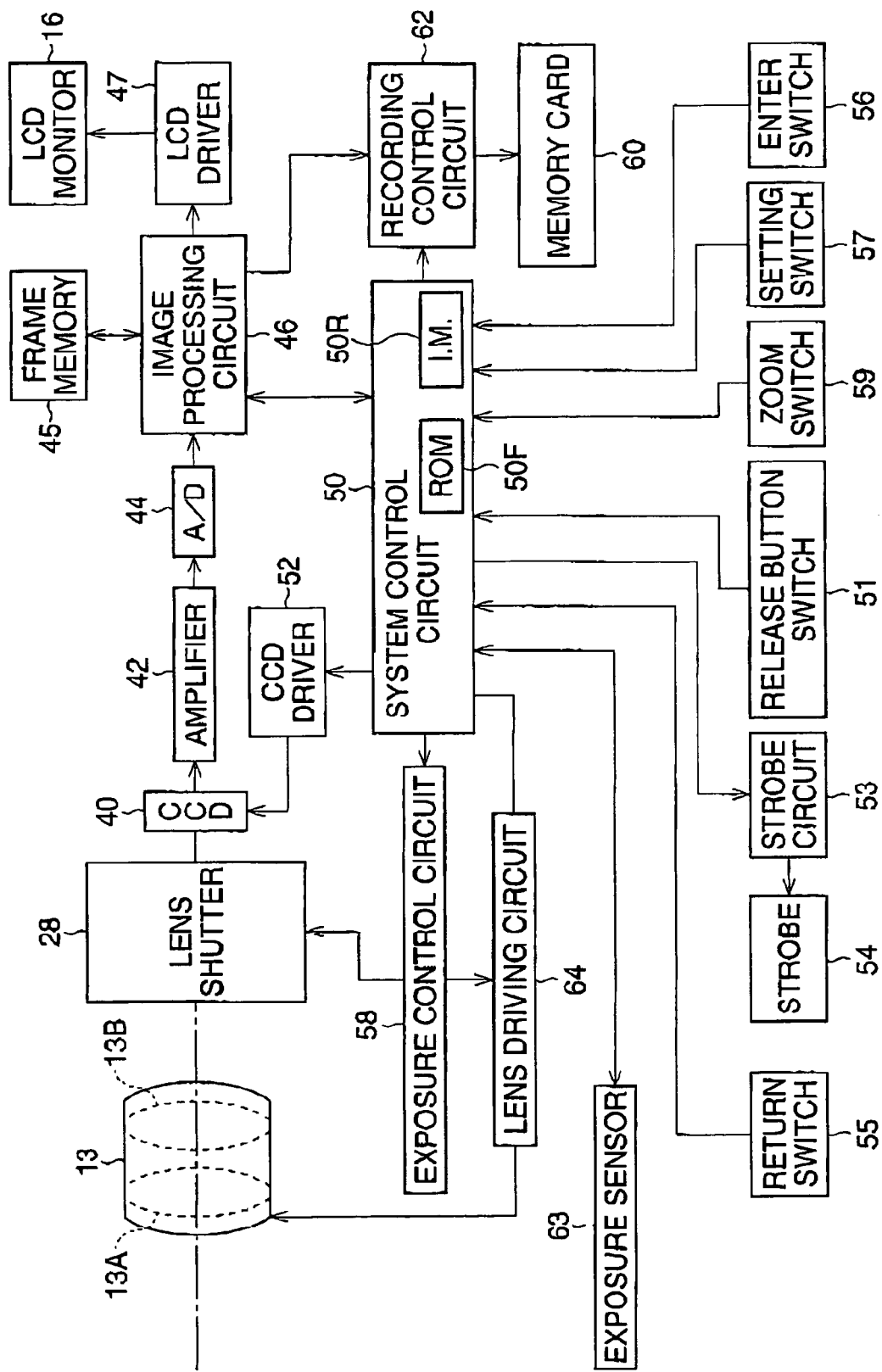
FIG. 2 is a block diagram of the digital still camera

FIG. 2 is a block diagram of the camera 10. A system controller with a CPU controls the camera 10, and a program for controlling a motion of the camera 10 is stored in a ROM 50F in the system controller 50.

A release button switch 51, a strobe circuit 53, a return switch 55, an enter switch 56, a setting switch 57, a zoom switch 59 are connected to the system controller 50. When electric power is turned ON by operating the power switch button 15, the power source is supplies power to each circuit. When the enter button 21 or the setting button 20 is operated, an operation signal is fed from the enter switch 56 or the setting switch 57 to the system controller 50. Based on the operation signal, the system controller 50 sets the mode. The release button switch 51 detects a half-push of the release button 14 and a full-push of the release button 14. In the information memory 50R, a mode, which is used just before electric power is turned OFF in the previous use, is stored.

When the photograph-mode is selected and determined, signal processes for displaying the moving-image are performed. Light passing through the optical photographing system 13 and a lens shutter 28 reaches a CCD 40, so that an object image is formed on the CCD 40 and analog image-pixel signals are generated in the CCD 40 by the photoelectric effect. The generated image-pixel signals are successively fed to an amplifier 42. A CCD driver 52 drives the CCD 40.

The image-pixel signal are amplified by an amplifier 42, and are converted to digital image signals in an A/D converter 44. The digital image signals are fed to an image processing circuit 46, wherein various processes, such as a white balance process, gamma correcting process, and so on, are performed. The processed digital image signals are temporarily stored in a frame memory 45 and fed to a LCD driver 47. The LCD driver 47 drives the LCD monitor 16 on the basis of the processed digital image signals so that the object image is displayed on the LCD monitor 16 as a moving-image. When the zoom button 22 is operated, a lens driving circuit 64 drives a zoom lens 13A by a given distance in accordance with an operation signal fed from the zoom switch 59. An exposure control circuit 5B controls the lens driving circuit 64 and the lens shutter 28.

When the release button 14 is halfway depressed, the release button switch 51 detects the half-depression. Then, the brightness of the object and the distance between the object and the camera 10 are measured by an exposure sensor 63, which is provided on the front surface of the camera 10. Further, to focus the object image, a focusing lens 13B is driven by the lens driving circuit 64. When the release button 14 is fully depressed, the release button switch 51 detects the full-depression, and the photograph action is performed. Namely, the lens shutter 28 opens for a predetermined time-interval, the object image is formed on the CCD 40, and one frame worth of image-pixel signals, corresponding to the object image, is read from the CCD 40. The image-pixel signals are fed to the amplifier 42, the A/D converter 44, and the image-processing circuit 46. The processed digital signals in the image processing circuit 46 are temporarily stored in the frame memory 45. The digital signals in the frame memory 45 are fed to a recording control circuit 62 as image data via the image processing circuit 46 and the system controller 50, wherein a compression process is performed on the image data. The compressed image data is stored in a memory card 60. The strobe circuit 53 controls the strobe 54.

When the replay-mode is selected, an image data selected by the user is read from the memory card 60. In the recording control circuit 63, the expansion process is performed on the recorded image data, and the expansion image data is temporarily stored in the frame memory 45 via the system controller 50 and the image processing circuit 46. The LCD driver 47 drives the LCD monitor 16 in accordance with the digital signals so that the selected still image is replayed on the LCD monitor 16.

Figure 3:
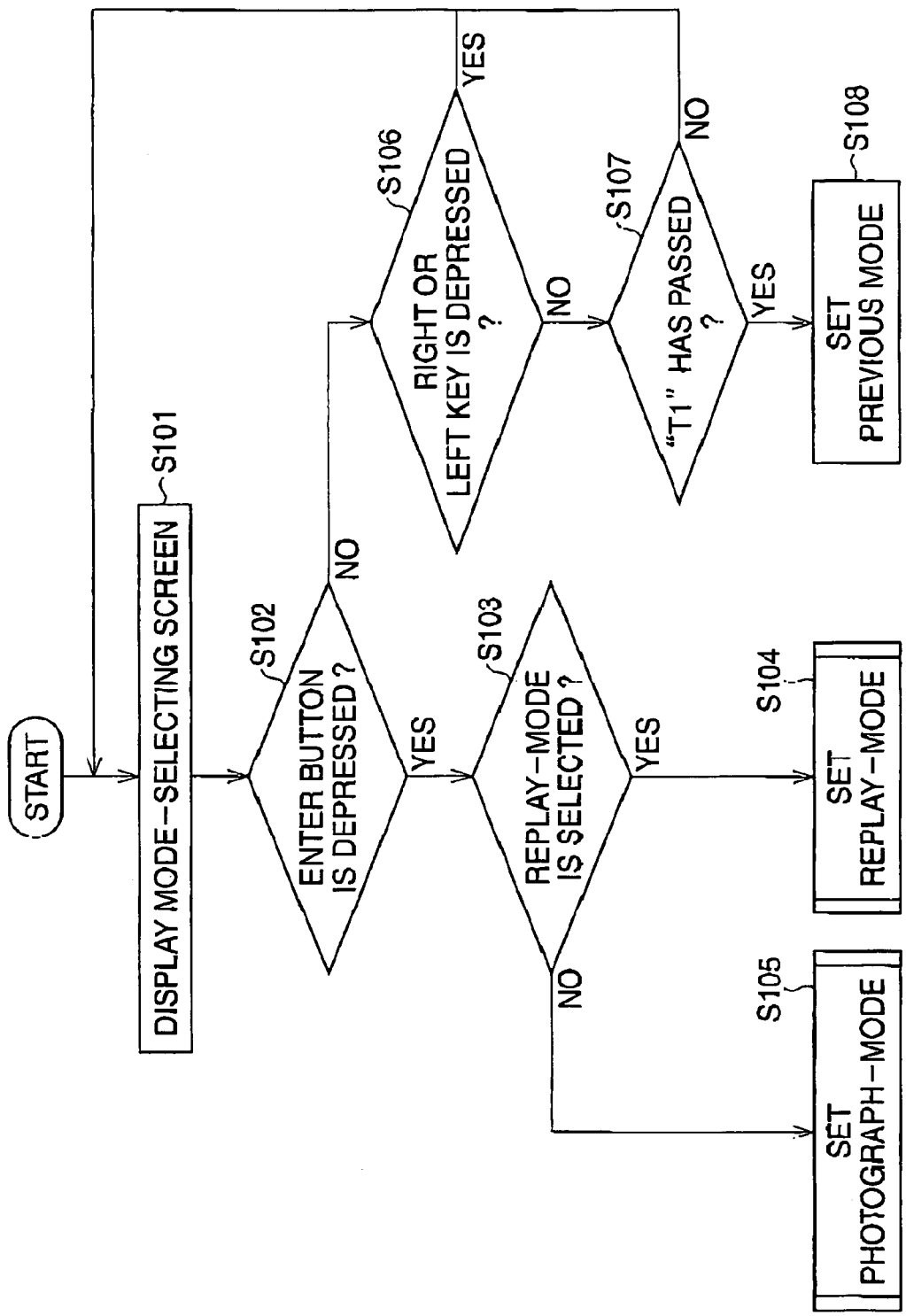
FIG. 3 is a flowchart showing an initial setting process.
Figure 4:
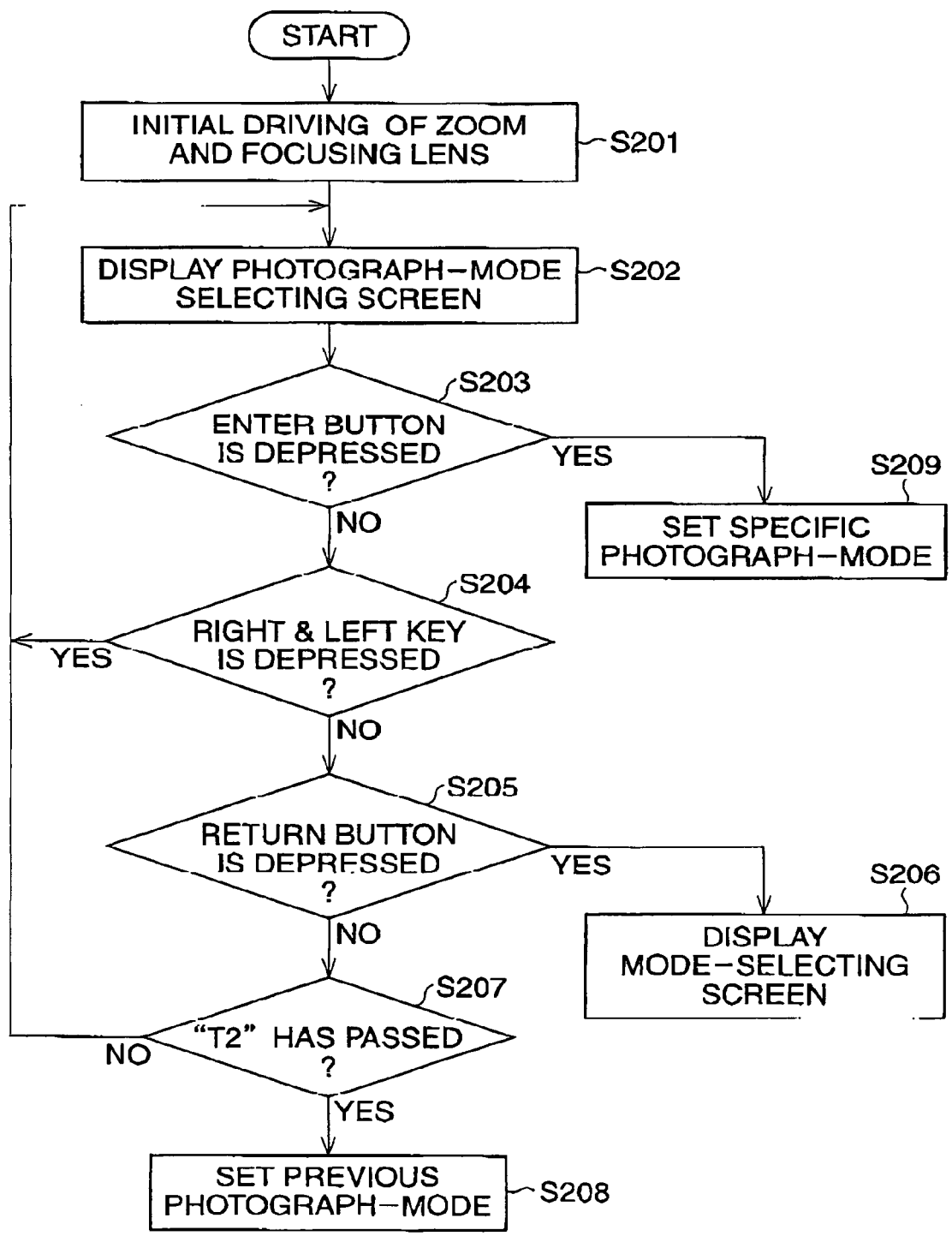
FIG. 4 is a flow chart showing a photograph-mode setting process.
Figure 5:
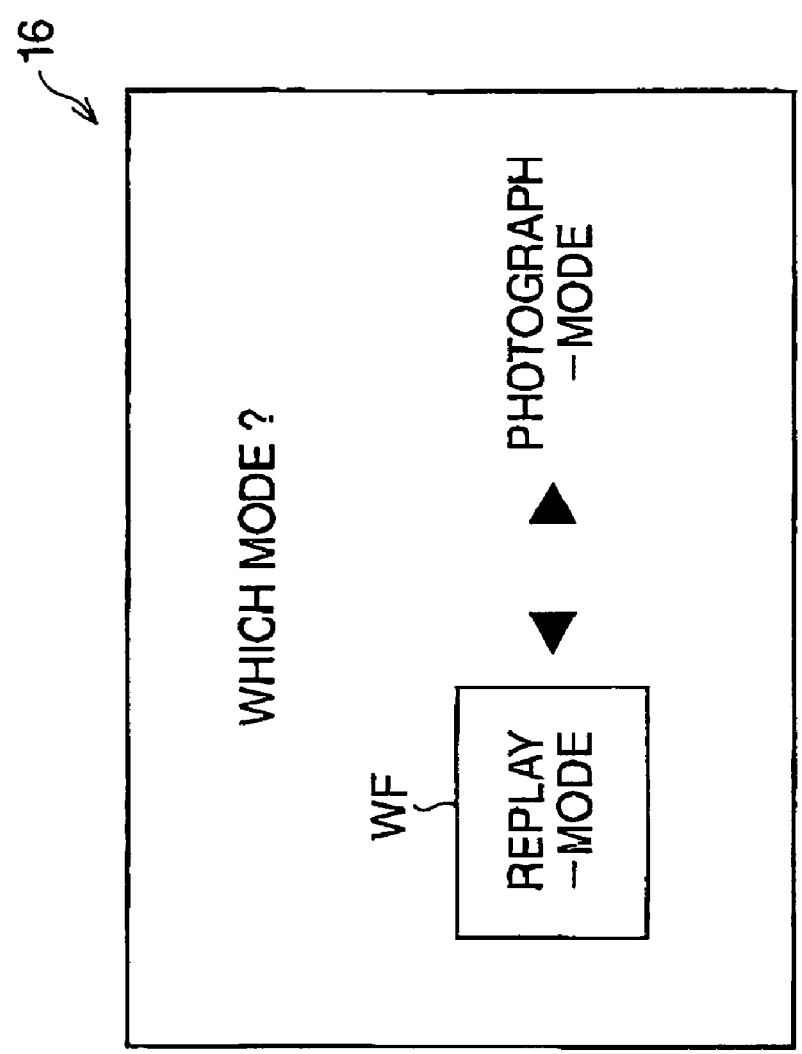
FIG. 5 is a view showing a mode-selecting screen.
Figure 6:
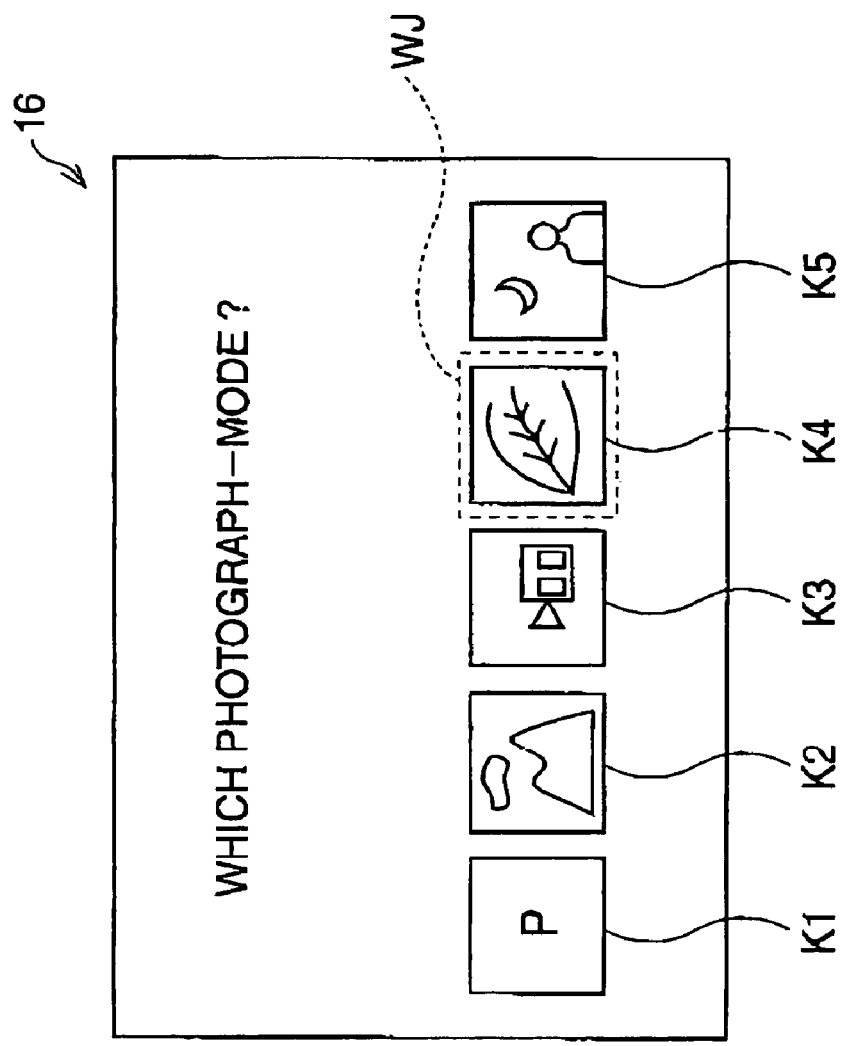
FIG. 6 is a view showing a photograph-mode selecting screen.

FIG. 3 is a flow chart showing an initial setting process. FIG. 4 is a flow chart showing a subroutine of Step S105 shown in FIG. 3. FIG. 5 is a view showing a mode-selecting screen that is displayed in the initial starting process after electric power is turned ON. FIG. 6 is a view showing a photograph-mode selecting screen. When the power switch button 15 is depressed, the initial starting process is started.

In Step S101, a control signal is fed from the system controller 50 to the image processing circuit 46 so as to display a mode-selecting screen on the LCD monitor 16. Herein, literal information corresponding to the mode is displayed such that the user can select one of the photograph-mode and the replay-mode (See FIG. 5). The user selects one mode by operating the right key and the left key of the setting button 20. Then, the selected mode is surrounded by a frame WF. Note that, when electric power is tuned ON, one of the photograph-mode and the replay-mode mode, which was set in the previous use, is surrounded by the frame WF in accordance with data stored in the information memory 50R. In Step S102, it is determined whether the enter button 21 is depressed.

When it is determined that the enter button 21 is not depressed, the process goes to Step S106, wherein it is determined whether the right or left key of the setting button 20 is operated to select the mode. When it is determined that the right or left key is operated, the process returns to Step S101, the display-process is performed such that the selected mode is surrounded by the frame WF. On the other hand, when it is determined that the right or left key is not operated, the process goes to Step S107.

In Step S107, it is determined whether the time since the electric power was turned ON has exceeded a given time-interval "T1". Namely, it is determined whether the time T1 has passed while the enter button 21 has not been operated. The time-interval T1 is set to one of range from 3 sec to 8 sec. When it is determined that the time T1 has passed, the process goes to Step S108. In Step S108, the photograph-mode or the replay-mode, which was set before electric power is turned OFF in the previous use, and which is stored in the information memory 50R, is automatically determined.

On the other hand, when it is determined that the enter button 21 is depressed in Step S102, the process goes to Step S103, wherein it is determined whether the replay-mode is selected. When it is determined that the replay-mode is selected, the process goes to Step S104, wherein the replay-mode is set. On the other hand, when it is determined that the photograph-mode is selected, the process goes to Step S105, wherein the photograph-mode is set.

FIG. 4 is a flow chart showing a subroutine of Step S105 in FIG. 3.

In Step S201, the zoom lens 13A and the focusing lens 13B are subjected to the initial driving. Namely, control signals are fed from the exposure control circuit 58 to the lens driving circuit 63 so that the zoom lens 13A and the focusing lens 13B are respectively driven to predetermined positions from accommodated positions in the body 10A. Then, the CCD 40 and the lens shutter 28 are subjected to the initial driving such that the user can shoot.

In Step S202, control signals are fed from the system controller 50 to the image processing circuit 46 so that the photograph-mode selecting screen, which is a screen for selecting a specific photograph-mode from plural photograph-modes, is displayed on the LCD monitor 16. As shown in FIG. 6, a picture mode K1, a landscape mode K2, a moving-image mode K3, macro-photograph mode K4, or a night-scene (dark) mode K5 are displayed as character information, and can be selected as a photograph-mode. In the picture mode K1, proper exposure values are automatically calculated in accordance with an object (for example, a person or flower). In the landscape mode K2, the focusing lens 13B is positioned to a given position such that an object at infinity is in focus. In the moving-image mode K3, the moving-image is recorded. In the macro-photograph mode K4, the optical photographing system 13 is driven to a given position so that the macro-photograph can be performed. Then, in the night-scene mode K5, the exposure value corresponding to the night-scene is calculated, and the slow synchronizing flash is performed. The user selects one photograph-mode by operating the left or right key of the setting button 20. The selected photograph-mode is surrounded by a frame WJ. Note that, when electric power is tuned ON, one photograph-mode, which was set in the previous use, is surrounded by the frame WJ in accordance with data stored in the information memory 50R.

In Step S203, it is determined whether the enter button 21 is depressed, namely, the specific photograph-mode is determined by the user. When it is determined that the enter button 21 is not depressed, the process goes to Step S204. In Step S204, it is determined whether the left or right key of the setting button 20 is depressed, namely, another photograph-mode is selected by the user. When it is determined that the left or right key is depressed, the process returns to Step S202. In Step S202, the photograph-mode surrounded by the frame WF is displayed on the LCD monitor 16. On the other hand, when it is determined that the left or right key is not depressed, the process goes to Step S205.

In Step S205, it is determined whether the return button 19 is depressed to display the mode-selecting screen shown in FIG. 5 again. When it is determined that the return button 19 is depressed, the process goes to Step S206, wherein the mode-selecting screen is displayed on the LCD monitor 16. On the other hand, when it is determined that the return button 19 is not depressed, the process goes to Step S207.

In Step S207, it is determined whether the time that the photograph-mode selecting screen has been displayed has exceeded a given time-interval "T2". Herein, when the user does not determine the specific photograph-rode for a long time, the photograph-mode that was set before the electric power was turned OFF in the previous use is automatically set. The time-interval "T2" is herein set to one of range from 3 sec to 8 sec. When it is determined that the time "T2" has passed, the process goes to Step S208. In Step S208, the photograph-mode that is set in the previous use and is recorded in the information memory 50 is set as a photograph-mode. On the other hand, when it is determined that the time "T2" has not passed, the process returns to Step S202.

On the other hand, when it is determined that the enter button 21 is depressed in Step S203, the process goes to Step S209, wherein the selected specific photograph-mode is determined. Based on the determined photograph-mode, the zoom lens 13A and the focusing lens 13B are driven. For example, when the macro-photograph mode is determined, the zoom lens 13A and the focusing lens 13B are driven to the positions corresponding to an object close to the camera. In the case of the landscape mode K2, the focusing lens 13B is driven to focus an image of an object at infinity.

In this way, in the present embodiment, when the electric power is turned ON, the mode-setting screen for selecting the photograph-mode or the replay-mode is displayed on the LCD monitor 16 (See FIG. 5). The user selects and determines one mode by using the setting button 20 and the enter button 21. When the photograph-mode is selected, the photograph-mode selecting screen is displayed (See FIG. 6), and the user selects and determines one specific photograph-mode from plural photograph-modes by using the setting button 20 and the enter button 21.

When the replay-mode is selected, the optical photographing system 13 with the zoom lens 13A and the focusing lens 13B, and the CCD 40 are not driven. Thus, unnecessary electric power consumption does not occur. Lenses are driven in accordance with the selected and determined mode so that lenses can be effectively positioned to a given position.

As for the photograph-mode, another specific photograph-mode, such as a digital filter for changing the tone of colors, may be selected in addition to the photograph-modes shown in FIG. 6. When selecting a mode in the mode-setting screen shown in FIG. 5, another mode, such as a menu mode, may be selected in addition to the photograph mode and the replay-mode shown in FIG. 5. Further, plural photograph modes and the replay-mode may be displayed on the LCD monitor 16 simultaneously so that the user can select one of the specific photograph-mode or the replay-mode.

In the present embodiment, the zoom lens 13A or the focusing lens 13B is driven when the photograph-mode is determined (S209), however, the zoom lens 13A or focusing lens 13B may be driven when the photograph-mode is selected and the selected photograph-mode is surrounded by the frame WJ (S204). Also, the zoom lens 13A or focusing lens 13B may be driven in accordance with the selected photograph-mode surrounded by the frame WJ at the same time the mode-selecting screen shown in FIG. 5 is changed to the photograph-mode selecting screen shown in FIG. 6. When another photograph-mode is selected while the zoom lens 13A or focusing lens 13B is driven, the zoom lens 13A or focusing lens 13B may be stopped and newly driven in accordance with the newly selected specific photograph-mode. While the mode-selecting screen is displayed, the last recorded image may be displayed on the LCD monitor 16. When both the setting button 20 and the enter button 21 are not operated and the time T1 has passed, a display-process associated with a histogram may be performed, in addition to the display-process of the recorded image.

In the present embodiment, the mode-selecting screen is firstly displayed when electric power is turned ON, however, the photograph-mode may be automatically selected and determined without displaying the mode-selecting screen. The time-interval "T1" or "T2" may be changed.

In the present embodiment, the optical photographing system 13 is driven when the camera is subjected to the initial driving. However, a camera, in which the initial driving of lenses is not performed, may be applied. A movie camera may be applied in place of the digital still camera.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 2004-023177 (filed on Jan. 30, 2004), which is expressly incorporated herein, by reference in its entirety.

The invention claimed is:

1. A digital camera with a display, comprising:
   a mode-setter provided on the digital camera, the mode-setter being configured to select and determine a mode from plural modes while electric power is ON;
   an initial-screen displayer, wherein when electric power is turned ON the initial-screen displayer displays an initial-setting screen configured to select an initial mode from a plurality of initial modes including a photographing mode; and
   a mode-setting processor that sets a selected and determined mode in accordance with an operation of the mode-setter, wherein the mode-setting processor sets a mode, which was set before the electric power was turned OFF in a previous use, when a given mode is not determined, after a given time has passed.

2. The digital camera of claim 1, wherein the plural modes comprise a photograph-mode configured to photograph an object and a replay-mode configured to replay a recorded object image, wherein the initial-screen displayer displays a photograph/replay selecting mode configured to select one of the photograph-mode and the replay-mode, and wherein the mode-setting processor sets a selected and determined mode.

3. The digital camera of claim 2, wherein the photograph mode comprises plural specific photograph modes, wherein the initial-screen displayer displays a photograph mode selecting screen configured to select one of the plural specific photograph modes when the photograph-mode is set, and wherein the mode-setting processor sets a selected and determined specific photograph mode.

4. The digital camera of claim 3, wherein the plural specific photograph modes comprise at least two of a picture mode where exposure values are automatically set in accordance with an object, a landscape mode configured to photograph an object at infinity or remote distance, a moving-image mode configured to record a moving-image, a macro-photograph mode configured to provide a close-up, and a night-scene mode configured to photograph an object at night.

5. A recording medium that stores a program for setting a mode associated with a digital camera with a display, comprising:
- an initial-screen displayer, wherein when electric power is turned ON the initial-screen displayer displays an initial-setting screen configured to select an initial mode from a plurality of initial modes including a photographing mode, and wherein the initial-setting screen is provided on the display; and
- a mode-setting processor that sets a selected and determined mode in accordance with an operation of a mode-setter, the mode-setter being provided on the digital camera, wherein the mode-setter is configured to select and determine a mode while electric power is ON, wherein the mode-setting processor sets a mode, which was set before the electric power was turned OFF in a previous use, when a given mode is not determined, after a given time has passed.

6. A computer-readable medium for setting a mode associated with a digital camera with a display, comprising:
- an initial-screen displayer, wherein when electric power is turned ON the initial-screen displayer displays an initial-setting screen configured to select an initial mode from a plurality of initial modes including a photographing mode, and wherein the initial-setting screen is provided on the display; and
- a mode-setting processor that sets a selected and determined mode in accordance with an operation of a mode-setter, the mode-setter being provided on the digital camera, wherein the mode-setter is configured to select and determine a mode while electric power is ON, and wherein the mode-setting processor sets a mode, which was set before the electric power was turned OFF in a previous use, when a given mode is not determined, after a given time has passed.

7. A method for setting a mode associated with a digital camera with a display, comprising:
- when electric power is turned ON, displaying an initial-setting screen configured to select an initial mode from a plurality of initial modes including a photographing mode;
- providing the initial-setting screen on the display; and
- setting a selected and determined mode in accordance with an operation of a mode-setter, the mode-setter being provided on the digital camera, wherein the mode-setter is configured to select and determine a mode while electric power is ON, and wherein the mode-setting processor sets a mode, which was set before the electric power was turned OFF in a previous use, when a given mode is not determined, after a given time has passed.

8. A digital camera with a display; comprising:
- a mode-setter provided on the digital camera, the mode-setter being configured to select and determine a mode from plural modes while electric power is ON;
- an initial-screen displayer that displays a mode-selecting screen configured to select a mode, the mode-selecting screen being displayed as an initial-setting screen when electric power is turned ON; and
- a mode-setting processor that sets a selected and determined mode in accordance with an operation of the mode-setter,
- wherein the mode-setting processor sets a mode, which was set before the electric power was turned OFF in a previous use, when a given mode is not determined, after a given time has passed.

* * * * *